(12) United States Patent
Grier

(10) Patent No.: US 11,706,624 B1
(45) Date of Patent: Jul. 18, 2023

(54) AGILE NODE ISOLATION THROUGH USING PACKET LEVEL NON-REPUDIATION FOR MOBILE NETWORKS

(71) Applicant: Jonathan Grier, Pikesville, MD (US)

(72) Inventor: Jonathan Grier, Pikesville, MD (US)

( * ) Notice: Subject to any disclaimer, the term of this patent is extended or adjusted under 35 U.S.C. 154(b) by 201 days.

(21) Appl. No.: 16/899,241

(22) Filed: Jun. 11, 2020

Related U.S. Application Data

(62) Division of application No. 15/989,149, filed on May 24, 2018, now Pat. No. 10,966,091.

(60) Provisional application No. 62/510,428, filed on May 24, 2017.

(51) Int. Cl.
| | | |
|---|---|---|
| *H04W 12/088* | (2021.01) | |
| *H04W 12/069* | (2021.01) | |
| *H04W 12/122* | (2021.01) | |
| *H04L 9/32* | (2006.01) | |
| *H04L 9/40* | (2022.01) | |

(52) U.S. Cl.
CPC ........... *H04W 12/088* (2021.01); *H04L 9/3263* (2013.01); *H04L 63/0823* (2013.01); *H04W 12/069* (2021.01); *H04W 12/122* (2021.01)

(58) Field of Classification Search
CPC ............ H04W 12/088; H04W 12/069; H04W 12/122; H04L 9/3263; H04L 63/0823
See application file for complete search history.

(56) References Cited

U.S. PATENT DOCUMENTS

| | | | | |
|---|---|---|---|---|
| 5,175,765 A * | 12/1992 | Perlman | ................ | H04L 29/06 713/180 |
| 6,243,466 B1 * | 6/2001 | Young et al. | ........ | H04L 9/0894 380/28 |
| 7,373,512 B1 * | 5/2008 | Just | ................... | H04L 63/0823 713/176 |
| 7,934,095 B2 * | 4/2011 | Laberteaux et al. | .... | H04W 4/80 713/169 |
| 8,098,820 B2 * | 1/2012 | Eskicioglu et al. | .... | H04L 9/083 725/6 |
| 8,499,150 B1 * | 7/2013 | Nachenberg | ........ | H04L 9/3268 713/176 |
| 8,745,616 B1 * | 6/2014 | Deacon | ................. | H04L 63/12 717/177 |
| 9,256,739 B1 * | 2/2016 | Roundy et al. | ........ | G06F 21/54 |
| 9,407,644 B1 * | 8/2016 | Cheng et al. | ...... | H04L 63/1408 |
| 10,110,558 B2 * | 10/2018 | Goyal et al. | ........ | H04L 63/0227 |
| 10,374,809 B1 * | 8/2019 | Dasarakothapalli et al. | ............... | H04L 9/30 |
| 10,966,091 B1 * | 3/2021 | Grier | ................... | H04L 9/3263 |
| 2002/0029200 A1 * | 3/2002 | Dulin et al. | ........ | H04L 63/0823 705/67 |
| 2003/0014665 A1 * | 1/2003 | Anderson et al. | . | H04L 63/1458 726/4 |
| 2003/0033375 A1 * | 2/2003 | Mitreuter et al. | .... | H04L 63/164 709/227 |

(Continued)

*Primary Examiner* — Jason Chiang
(74) *Attorney, Agent, or Firm* — Richard M Lehrer; FisherBroyles LLP

(57) ABSTRACT

Apparatus, systems and methods for agile network isolation through use of packet level non-repudiation (PLNR) are provided. Using a fast cryptography to verify that incoming packets are undeniably being received from the identified source, real-time attack notifications can be independently verified and shared among the network devices to remove compromised nodes from the network. The ability to collaborate among nodes without trust may be achieved via PLNR, to share attack notifications in real-time may be achieved via Telling Attack Layer (TATL), and to establish the identity of an attack in a permanent and binding way may be achieved via DISCOvery (DISCO).

13 Claims, 10 Drawing Sheets

(56) References Cited

U.S. PATENT DOCUMENTS

| | | | | |
|---|---|---|---|---|
| 2003/0185240 | A1* | 10/2003 | Vuong | H04M 15/48 370/395.52 |
| 2003/0217165 | A1* | 11/2003 | Buch et al. | H04L 65/1006 709/229 |
| 2004/0133499 | A1* | 7/2004 | Mitreuter et al. | G06Q 20/04 705/37 |
| 2004/0193919 | A1* | 9/2004 | Dabbish et al. | G06F 21/57 726/8 |
| 2004/0268123 | A1* | 12/2004 | Le et al. | H04L 9/3073 713/160 |
| 2005/0086512 | A1* | 4/2005 | Lee et al. | H04L 63/0245 726/26 |
| 2006/0048212 | A1* | 3/2006 | Tsuruoka et al. | H04L 9/3271 726/4 |
| 2006/0070122 | A1* | 3/2006 | Bellovin | H04L 63/0236 726/14 |
| 2006/0090065 | A1* | 4/2006 | Bush et al. | H04L 51/30 713/153 |
| 2006/0155981 | A1* | 7/2006 | Mizutani et al. | H04L 63/10 713/150 |
| 2006/0155984 | A1* | 7/2006 | Tsuchida et al. | H04L 67/42 713/156 |
| 2006/0156401 | A1* | 7/2006 | Newstadt et al. | H04L 63/1408 726/22 |
| 2006/0264202 | A1* | 11/2006 | Hagmeier et al. | H04L 63/0884 455/411 |
| 2006/0274693 | A1* | 12/2006 | Nikander et al. | H04L 69/167 370/389 |
| 2008/0060055 | A1* | 3/2008 | Lau et al. | H04L 63/0823 726/3 |
| 2009/0046854 | A1* | 2/2009 | Di Crescenzo et al. | H04L 9/0891 380/44 |
| 2009/0178132 | A1* | 7/2009 | Hudis et al. | H04L 63/20 726/12 |
| 2009/0183260 | A1* | 7/2009 | Hernacki et al. | H04L 63/1416 370/242 |
| 2009/0235071 | A1* | 9/2009 | Bellur et al. | H04W 12/082 713/158 |
| 2011/0173342 | A1* | 7/2011 | Cooper et al. | H04L 63/083 709/233 |
| 2011/0231443 | A1* | 9/2011 | Hannel et al. | H04L 63/0428 707/E17.014 |
| 2011/0238986 | A1* | 9/2011 | Kherani et al. | H04L 63/0823 713/168 |
| 2012/0047572 | A1* | 2/2012 | Duncan et al. | H04L 69/167 726/13 |
| 2012/0265984 | A1* | 10/2012 | Ramanujan | H04L 9/32 713/176 |
| 2013/0031191 | A1* | 1/2013 | Bott | H04W 4/06 709/224 |
| 2013/0081129 | A1* | 3/2013 | Niemelae | H04L 63/0236 726/22 |
| 2013/0083717 | A1* | 4/2013 | Vos et al. | H04W 4/06 370/312 |
| 2013/0117558 | A1* | 5/2013 | Metke et al. | H04L 9/3268 713/156 |
| 2013/0156017 | A1* | 6/2013 | Hori et al. | G08G 1/096758 380/255 |
| 2013/0318242 | A1* | 11/2013 | Srinivasa | H04L 41/042 709/226 |
| 2014/0351581 | A1* | 11/2014 | Pritikin | H04L 9/3268 713/158 |
| 2015/0101048 | A1* | 4/2015 | Sridhara et al. | G06F 21/54 726/23 |
| 2015/0222656 | A1* | 8/2015 | Haugsnes | G06F 21/552 726/23 |
| 2015/0332266 | A1* | 11/2015 | Friedlander et al. | H04L 63/0428 705/75 |
| 2016/0006755 | A1* | 1/2016 | Donnelly et al. | H04L 63/18 726/1 |
| 2016/0182492 | A1* | 6/2016 | Bean et al. | H04L 63/0823 713/156 |
| 2017/0026183 | A1* | 1/2017 | Strong et al. | H04L 9/3247 |
| 2017/0126740 | A1* | 5/2017 | Bejarano Ardila et al. | H04L 63/1433 |
| 2017/0324545 | A1* | 11/2017 | Brandenburger et al. | H04L 63/0823 |
| 2017/0338951 | A1* | 11/2017 | Fu et al. | H04L 9/0852 |
| 2018/0183831 | A1* | 6/2018 | Amin | H04L 63/1416 |
| 2018/0234256 | A1* | 8/2018 | Bowen | H04L 63/166 |
| 2018/0262339 | A1* | 9/2018 | Kazin et al. | H04L 9/14 |
| 2018/0262345 | A1* | 9/2018 | Frederick et al. | H04L 9/3247 |
| 2018/0262347 | A1* | 9/2018 | Levy et al. | H04L 9/006 |
| 2018/0262487 | A1* | 9/2018 | Zaifman et al. | H04L 63/0428 |
| 2018/0288015 | A1* | 10/2018 | Kudaraya et al. | H04L 61/2092 |

\* cited by examiner

AGILE NODE ISOLATION THROUGH USING PACKET LEVEL NON-REPUDIATION FOR MOBILE NETWORKS

CROSS REFERENCE TO RELATED APPLICATIONS

This application is a divisional of and claims the benefit of the filing date of U.S. Pat. Application Serial No. 15/989,149 titled "Agile Network Isolation through use of Packet Level Non-Repudiation for Airborne Tactical Networks," which was filed in the USPTO on May 24, 2018 and, which claims the benefit of the filing date of U.S. Provisional Pat. Application Number Serial No. 62/510,428, titled "Agile Network Isolation through use of Packet Level Non-Repudiation for Airborne Tactical Networks," which was filed in the USPTO on May 24, 2017 and which includes the same inventor. That provisional application is hereby incorporated by reference as if fully set forth herein.

FIELD OF THE TECHNOLOGY

The technology of the application relates generally to network protection and more specifically, but not but not exclusively to apparatus and methods to dynamically reconfiguring a mobile network to isolate one or more compromised nodes.

BACKGROUND OF THE TECHNOLOGY

Securing ad-hoc, mobile networks, which typically do not have a perimeter defense is an issue that researchers have been attempting to, but failing to resolve for quite some time. Due to the decentralized nature of these networks (e.g. tactical networks, aviation networks, etc.), which lack an inside, an outside, a perimeter, or a gateway, no node can fully trust other nodes. One of the issues preventing a viable solution is the computational overhead of generating/verifying e-signatures on node resources.

In the event of military conflict, military operation and/or response to terrorist activity, a tactical network may be subjected to high intensity cyber-attack. Such an attack may only last for a short period of time and thus the attacker(s) may not be as concerned with being detected as with the ability to disrupt the network. For defenders of the network, manual investigation, incident response and re-provisioning may be too slow to ensure mission success. A network compromise of even an hour can result in mission failure and/or loss of life. For such highly contested networks, perimeter defense is insufficient: during a conflict, the adversary can be assumed to have compromised at least some nodes and may already be inside.

In view of these deficiencies in traditional mobile network security, the instant disclosure identifies and addresses a need for apparatus and methods to dynamically reconfiguring a mobile network to isolate one or more compromised nodes.

BRIEF SUMMARY OF THE TECHNOLOGY

Many advantages of the technology will be determined and are attained by the technology, which in a broad sense provides apparatus and methods for agile node isolation using packet level non-repudiation for mobile networks.

In one or more implementations of the technology, a method is provided for dynamically reconfiguring a mobile network, at least a portion of the method being performed by a computing device that includes at least one processor. The method may include receiving at the computing device a packet of information, and the computing device analyzing the packet of information to determine if the packet includes an authentication header that is associated with a certificate. If the computing device determines that the authentication header is not associated with a certificate, then the method may include the computing device dropping the packet of information. If the computing device determines that the authentication header is associated with a certificate, then the method may include the computing device determining if a status of the certificate is allowed or a disallowed.

In one or more implementations of the technology, a system is provided for isolating a compromised node within a mobile network. The system may include at least two nodes communicating through a wide area network (WAN). The system may also include a security apparatus that has a processor and a memory, the security apparatus being located between a nodes and the WAN. The security apparatus may include a packet level non-repudiation (PLNR) module, stored in memory, that receives a packet over the WAN. The packet may include an authentication header (AH) such that at least a portion of the authentication header is associated with a certificate that is used to authenticate the packet transmitted by another node. The system may also include a discovery module, stored in memory, that maintains a database of active certificates and inactive certificates. An inactive certificate may indicate to the PLNR module that the packet belongs to a compromised node and should be dropped.

In one or more implementations of the technology, a non-transitory computer-readable medium is provided that may include one or more computer-executable instructions that, when executed by at least one processor of a computing device, cause the computing device to receive an Internet Protocol (IP) packet. The instructions may also cause the computing device to deconstruct the packet to obtain an authentication header (AH), wherein the header includes a public key associated with the sender of the packet and associated with a certificate. The instructions may also cause the computing device to determine that a status of the certificate is enabled and perform additional processing on the packet.

Features from any of the above-mentioned embodiments and/or examples may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

For a better understanding of the technology, reference is made to the following description, taken in conjunction with the accompanying drawings, in which like reference characters refer to like parts throughout, and in which.

Figure 1:
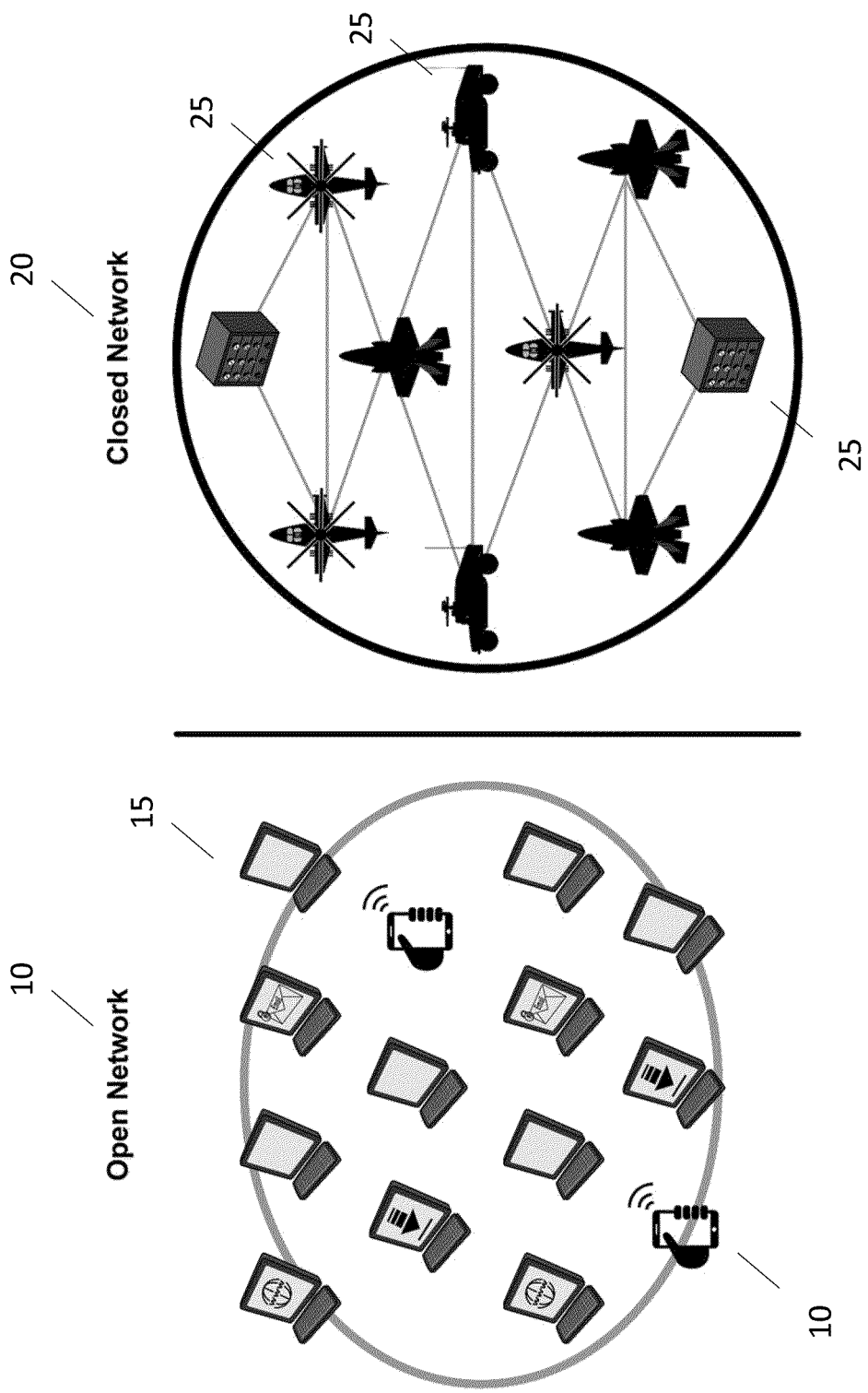
FIG. 1 illustrates conventional open and closed networks.

The technology will next be described in connection with certain illustrated embodiments and practices. However, it will be clear to those skilled in the art that various modifications, additions, and subtractions can be made without departing from the spirit or scope of the claims.

DETAILED DESCRIPTION OF THE INVENTION

Referring to the drawings in detail wherein like reference numerals identify like elements throughout the various figures, there is illustrated in FIGS. 1-10 apparatus, systems and methods for removing or isolating a compromised node from a mobile network using packet level non-repudiation. Principles and operations of the technology may be better understood with reference to the drawings and the accompanying description.

Figure 2:
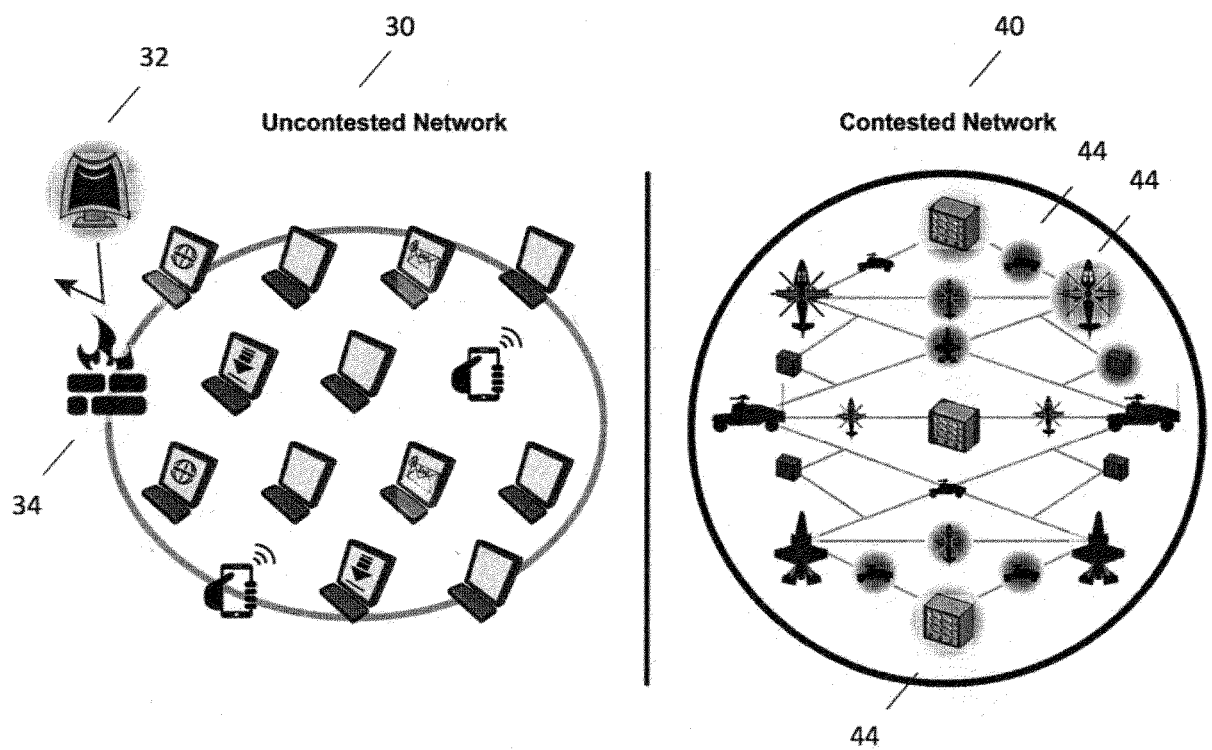
FIG. 2 illustrates a contested network vs. an uncontested network.

FIG. 1, illustrates an open network 10, in which communications may not be restricted between devices 15, and a closed network 20, in which communications may be restricted to authorized devices 25. As illustrated in FIG. 2, a network may be uncontested 30, in which case attackers 32 are typically outside of the network and conventional perimeter security 34 (e.g. a firewall, gateway, etc.) may be sufficient to limit or prevent attacks, or contested 40, in which case one or more nodes of the network may already be compromised 44 and thus perimeter security is typically ineffective.

Given the expectation of high intensity conflict, tactical networks (and other mobile networks) may benefit from the ability to identify and contain attackers in real-time, as they attempt to expand their area of detrimental control. Tactical networks under high intensity cyber-attack may continue to operate using the remaining uncompromised nodes while ignoring the compromised nodes. Agile isolation provides the ability to quickly remove an attacking node from the network after an attack has been detected and may be effective for networks with no perimeter defense.

Agile isolation may be well suited for (but not limited to) closed, mobile networks (e.g. tactical networks, aviation networks, etc.) as it may collaborate without trust between devices. Using a fast cryptography to verify that incoming packets are undeniably being received from the identified source, real-time attack notifications can be independently verified and shared among the network devices. The identity of an attack may also be established in a binding way. The ability to collaborate without trust may be achieved via PLNR, to share attack notifications in real-time may be achieved via TATL, and to establish the identity of an attack in a permanent and binding way may be achieved via DISCO.

AH may be used to authenticate IP traffic, which ensures that devices are communicating with other devices that they are expecting to communicate with, detects alteration of data in transit, and guards against man-in-the-middle attacks. Authentication may be done by digitally signing multiple fields in the IP packet and storing this new AH header in the IP header. ESP may be employed for data confidentiality.

It is commonly understood that digital signature is less resilient against denial of service (DoS) attacks since an attacker may feed a node with many bogus signatures, however the disclosed technology may first check to see if the public key is part of its trusted list before doing signature verification, thus reducing the effectiveness of this type of attack. A malicious node would need a valid certificate for each key in order be effective.

Discussion of an embodiment, one or more embodiments, an aspect, one or more aspects, a feature, one or more features, or a configuration or one or more configurations, an instance or one or more instances is intended be inclusive of both the singular and the plural depending upon which provides the broadest scope without running afoul of the existing art and any such statement is in no way intended to be limiting in nature. Technology described in relation to one or more of these terms is not necessarily limited to use in that embodiment, aspect, feature or configuration and may be employed with other embodiments, aspects, features and/or configurations where appropriate.

Acronyms used herein:
PLNR - Packet Level Non-Repudiation
TATL - Telling Attack Layer
DISCO - Discovery
IEAD - Ingress/Egress Attack Detection
MTU - Maximum Transmission Unit
AH - Authentication Header
IP - Internet Protocol
CA - Central Authority
ESP - Encapsulation Security Payload
WAN - Wide Area Network For purposes of this disclosure "computer", "device", "node", "end node" or "end device" means a mobile phone, laptop computer, tablet computer, personal digital assistant ("PDA"), desktop computer, electronic reader ("e-reader"), mobile game console, smart watch, smart glasses, voice assistant devices, or any other mobile device which can transmit and receive data. It may also be used to refer to peripheral devices used with such devices. These devices may be located on planes, in automobiles, tanks, satellites, hand-held, etc.

For purposes of this disclosure "remote" means accessible via a network wherein at least two of the devices need not be collocated to communicate.

Figure 3:
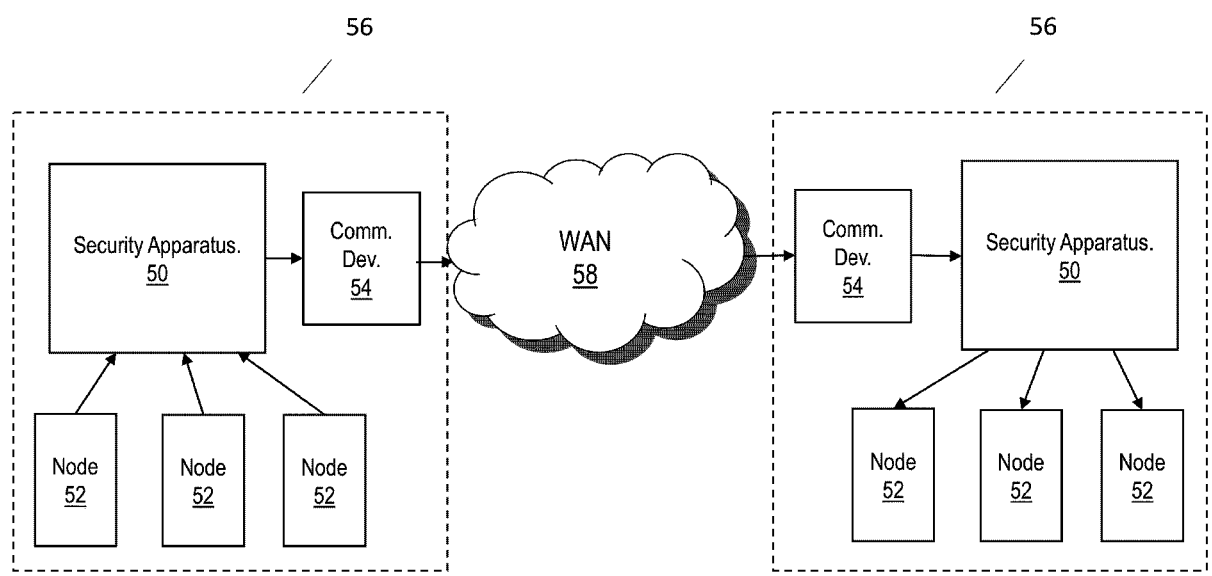
FIG. 3 is a block diagram illustrating an exemplary network secured in accordance with one or more embodiments of the technology.

Without limiting the scope of the technology, FIG. 3 illustrates a block diagram of a security apparatus 50 which may provide effective protection to a closed but contested network. The security apparatus 50 may be realized in hardware and/or software and may be a standalone device, an adjunct to one or more end devices or integrated with one or more end devices. A security apparatus 50 may operate with a single endpoint or multiple endpoints depending upon the configuration and design choices of the network and/or of the security apparatus 50. In one or more embodiments, security apparatus 50 may be placed into the network between an endpoint 55 and a communications device 54. Those skilled in the art will recognize that a security apparatus 50 may include a communications device 54 and thus eliminate the need for a separate communications device 54.

While FIG. 3 illustrates only 2 security apparatuses 50, 3 endpoints 52 and 1 communications device 54 on each subnetwork 56 and only illustrates 2 subnetworks 56 communicating through WAN 58, this is for ease of illustration only and the technology is not so limited.

In one or more embodiments, packets 100 arrive through WAN 58 to interface 54 and are processed by security apparatus 100. Keys are checked against DISCO's whitelist/blacklist. If a key needs a certificate, requests are handled by DISCO. Packets then pass to IEAD on their way to the LAN. If a packet is flagged by IEAD as an attack it is passed to TATL for handling.

Figure 4:
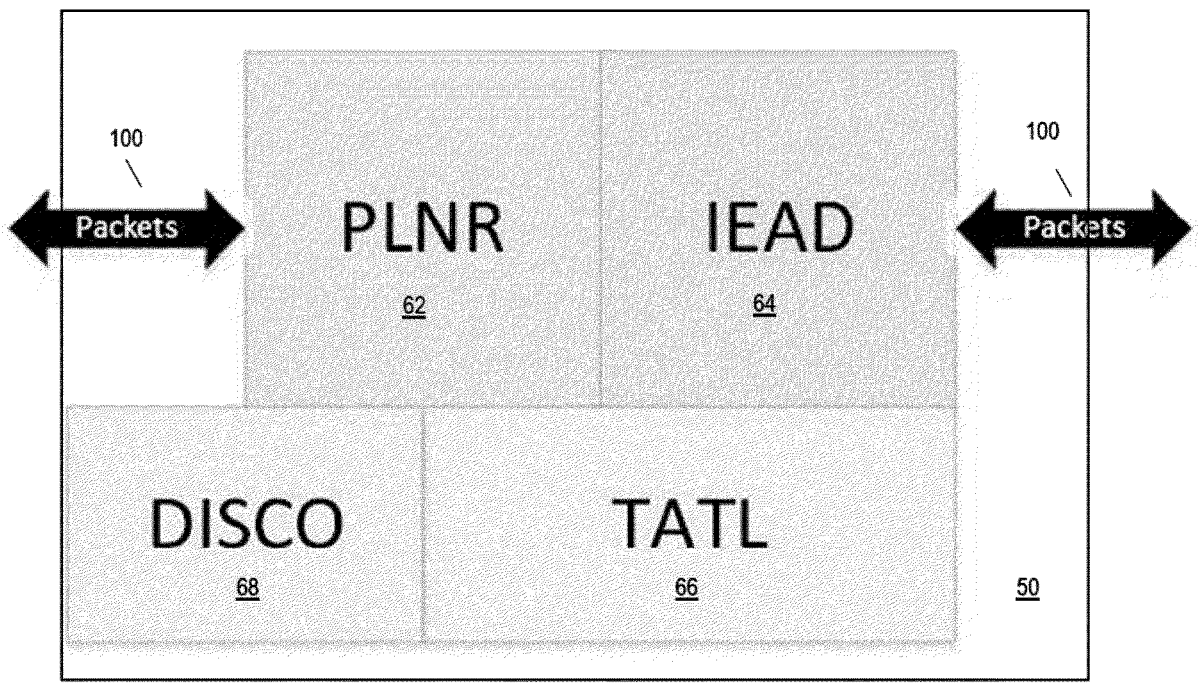
FIG. 4 is a block diagram illustrating a security apparatus of FIG. 3 in accordance with one or more embodiments of the technology.
Figure 5:
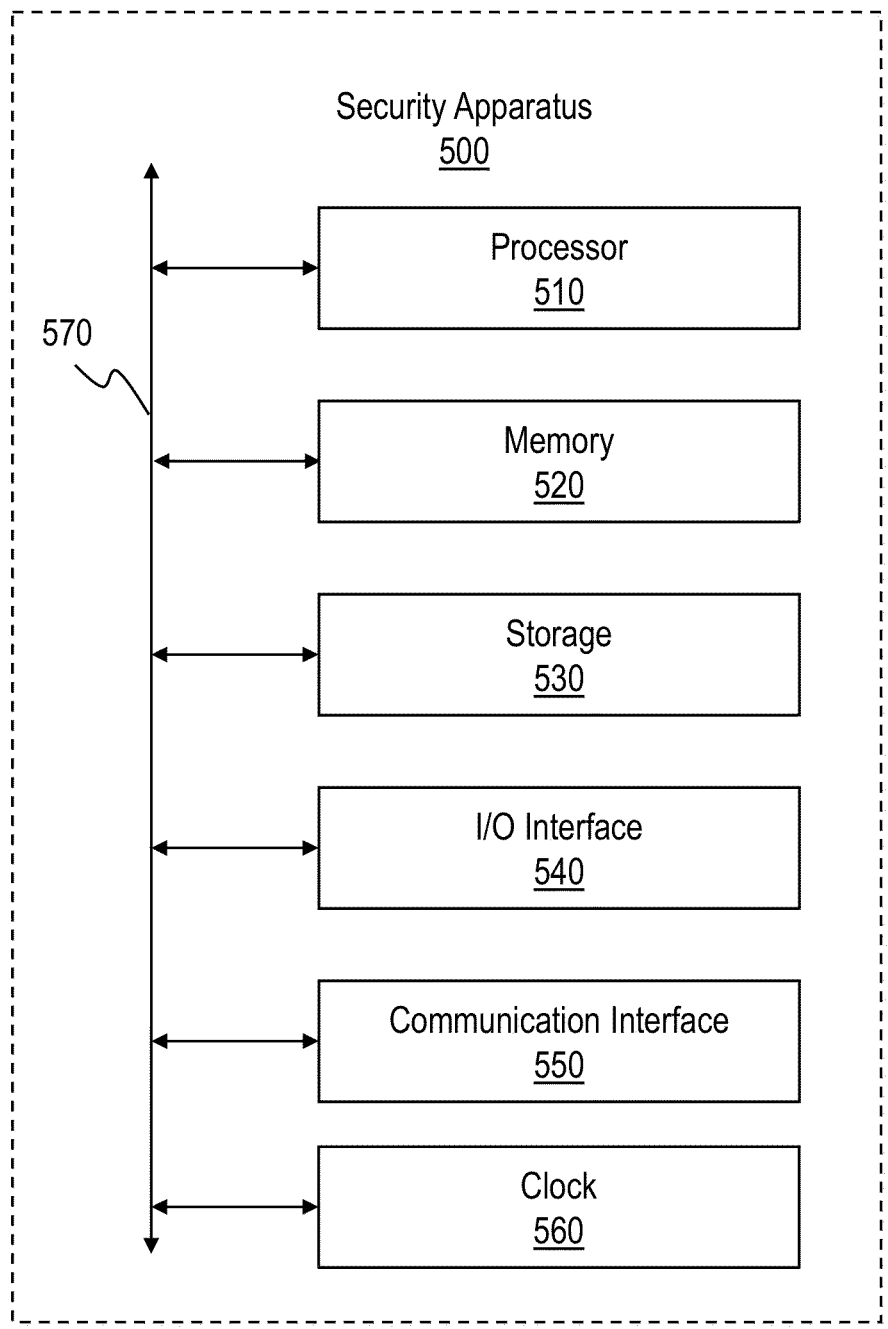
FIG. 5 provides a block diagram illustrating elements which may be present in the security apparatus of FIG. 4.

FIG. 4 is a functional block diagram of a security apparatus 50 illustrating various modules which provide network security and their interactions. Aside from the various modules illustrated in FIG. 4, security apparatus 50 may include one or more elements illustrated in FIG. 5 (e.g. processor 510, memory 520, storage 530, input/output interface 540, communication interface 550, clock 560 and bus 570) which may be employed to realize one or more of the various modules. As illustrated, security apparatus 50 may include PLNR module 62, IEAD module 64, TATL module 66 and DISCO module 68. Most packets 100 (trusted traffic) will only travel through PLNR module 62 and IEAD module 64. DISCO module 68 and TATL module 66 interactions will be less frequent.

Generally, IEAD module 64 performs attack detection after decryption/before encryption, PLNR module 62 signs and verifies incoming and outgoing packets in a non-repudiable, non-spoofable manner. PLNR module 62 confirms through DISCO module 68 that public keys are valid. TATL module 66 verifies incoming attack notifications and creates attack notifications if found by IEAD module 64. If an attack notification is verified, it is sent to DISCO for blacklisting. DISCO exchanges certificates and public keys with other nodes, and keeps track of the whitelist/blacklist.

PLNR module 62 ensures that, when a node sends a packet, it cannot deny that it sent the packet. Receiving nodes can cryptographically verify that the packet was transmitted by the sending node and the sending node cannot refute the verification. Being able to cryptographically verify, in real-time, all IP traffic received at a node, provides network security which allows nodes to send and receive IP traffic without the need for a perimeter defense. This makes the network more resilient since a compromised node will not compromise the rest of the network.

Figure 6:
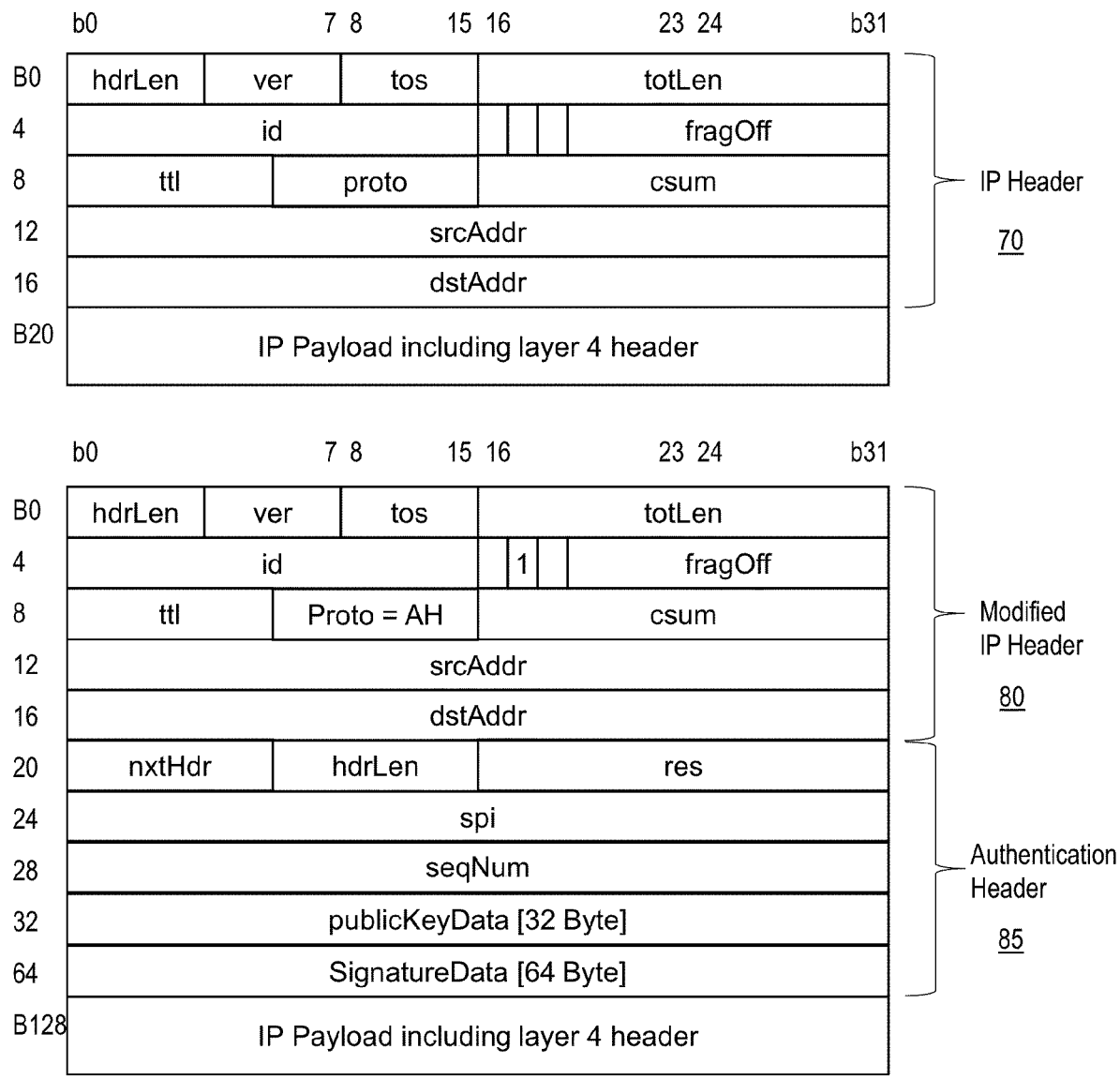
FIG. 6 is a block diagram of exemplary IP packets transmitted and received by the security apparatus of FIG. 4 in accordance with one or more embodiments of the technology.

Public key one-way signature/cryptography using ED25519 or a similar protocol may be inserted into the AH 85 of packet 100 at the IP layer as shown in FIG. 6. Ed25519 is preferred but not required because it has very attractive features. It is fast, strong, has a small signature (64 bytes), and a small key (32 bytes). It has a similar security level to RSA with ~3000-bit keys. The top packet of FIG. 6 illustrates a non-authenticated IP packet and the lower packet of FIG. 6 illustrates a modified/signed IP packet. The packet 100 is signed by the sender and can be verified by the receiver. The public key is trusted since it is linked to a certificate, discovered by DISCO.

Figure 7:
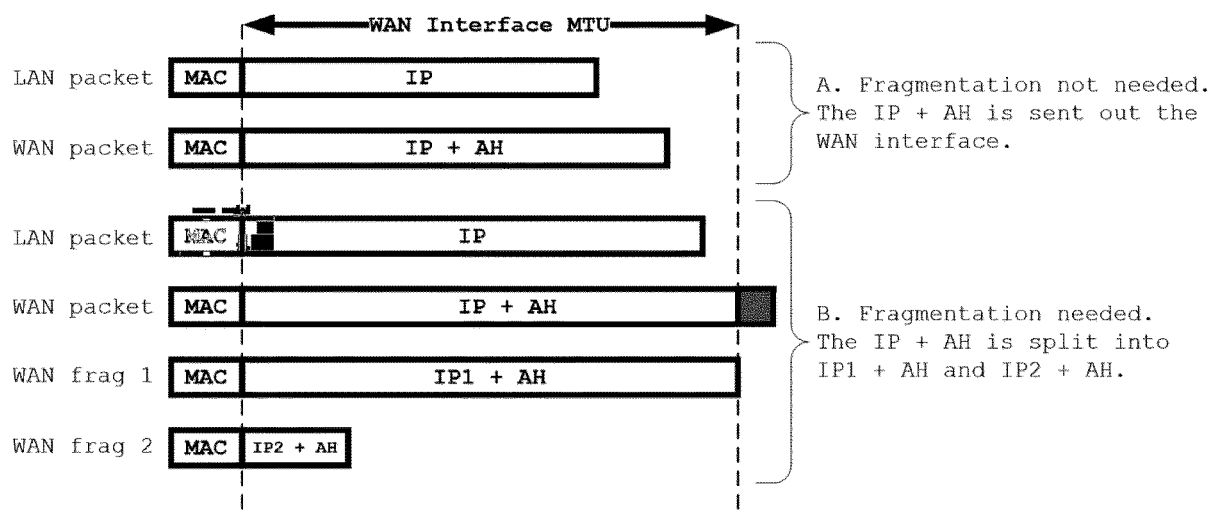
FIG. 7 provides a block diagram illustrating packet fragmentation in accordance with one or more embodiments of the technology.
Figure 8:
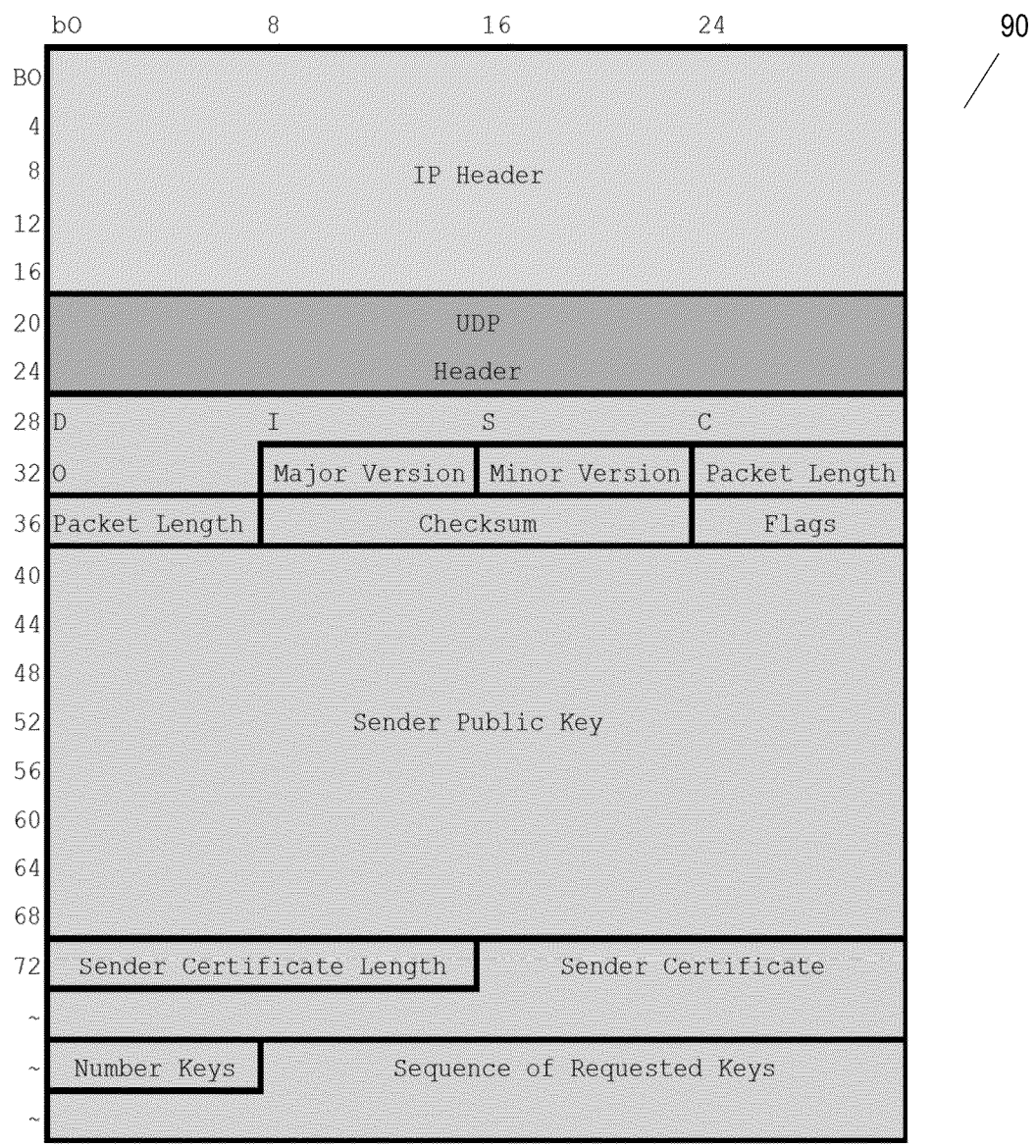
FIG. 8 provides a block diagram illustrating a DISCO control packet in accordance with one or more embodiments of the technology.
Figure 9:
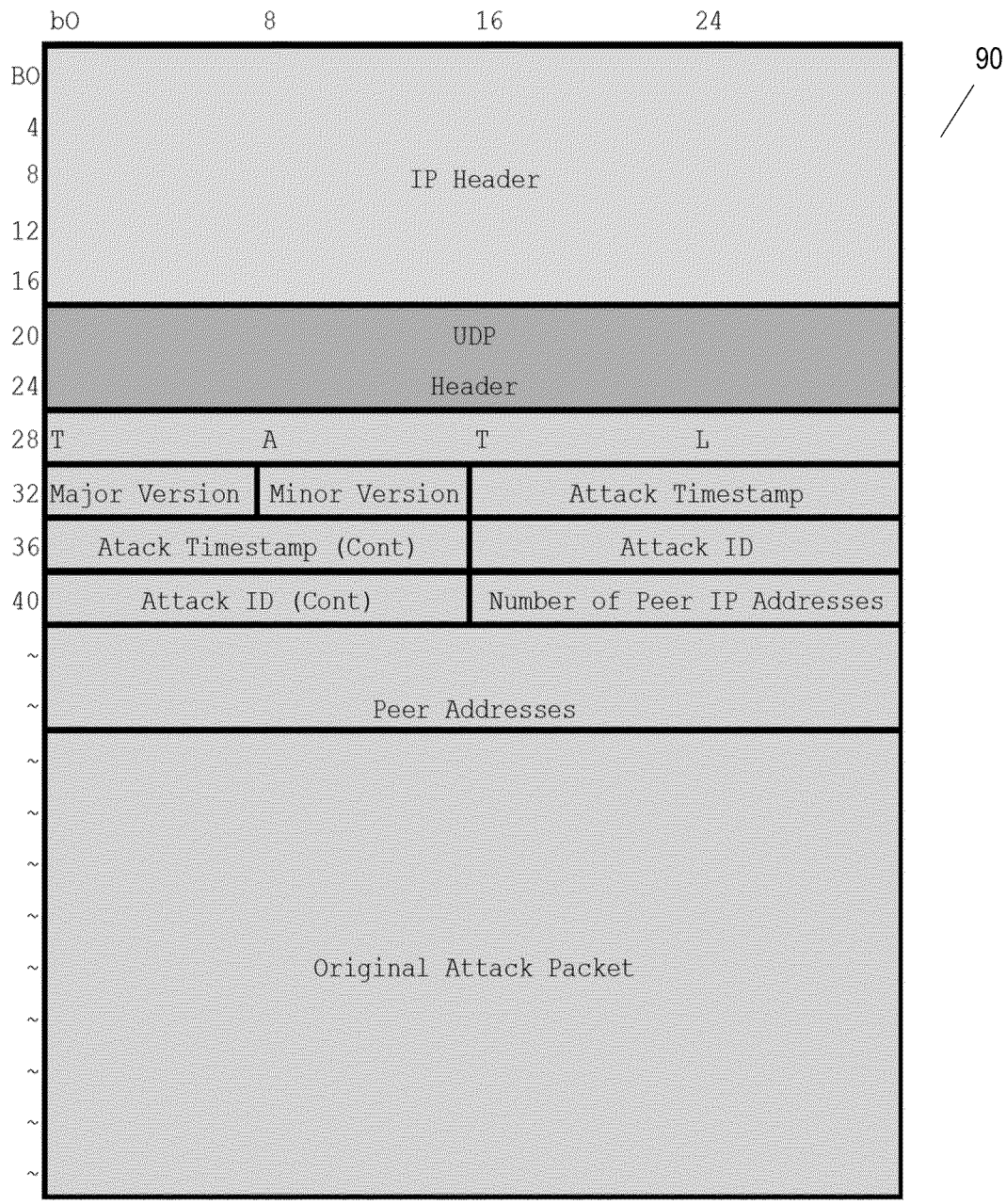
FIG. 9 provides a block diagram illustrating a TATL control packet in accordance with one or more embodiments of the technology.

PLNR module 62 (FIG. 4) handles all IP packets in transit through the security apparatus 50. There may be two types of IP packets which may traverse this module. A non-authenticated IP packet normally originates in an endpoint sub-network (FIG. 3) and is received on a LAN interface of security apparatus 50 (not illustrated). When a non-authenticated packet arrives, it may be signed: a transport mode AH may be generated and attached before the packet is forwarded over the WAN egress point. If adding an AH causes the packet to go above the MTU, the PLNR module 62 may perform packet fragmentation (FIG. 7). A packet received at the security apparatus 50 from the WAN is normally expected to have the AH already attached, preceding the original Layer 4 protocol header (although it can be placed in other locations). After the AH is verified and removed, the plain IP packet may be forwarded to the sub-network. PLNR module 62 checks private keys against DISCO module's 68 whitelist/blacklist.

A security apparatus 50 may have access to all IP packets that arrive on either of its interfaces (LAN or WAN) and it adds or respectively checks and strips off the AH and updates some of the IP header fields before forwarding the packet to the appropriate network. Two families of sockets (receive and send LAN/WAN) may provide the security apparatus with the required packet access. This is because, per the raw socket manual, "Receiving of all IP protocols via IPPROTO_RAW is not possible using raw sockets," but sending packets complete with IP header and regardless of the higher-level protocol is possible.

DISCO module 68 may maintain a blacklist/whitelist of public keys and certificates (e.g. OpenSSL x509) that it can optionally store and retrieve (e.g. via SQLite). When accepting new certificates, and loading certificates from the database, it may verify them (e.g. using the OpenSSL library). When a request packet is built, the node's certificate may be inserted and the key whose certificate is needed may be added. When a DISCO control packet 90 is received, the certificate of the sender may be verified and added to the database, if the key requested belongs to the node, the certificate of the node may be sent to the original sender. If TATL module 66 can verify the identity and attack signature of a received TATL control packet, DISCO module 68 may remove the public key and/or certificate from the whitelist and add it to the blacklist. Since a tactical network may have an open infrastructure, trust may be managed locally at the individual node level. Each node in the network may have a certificate with its public key and signature by the CA. A DISCO control packet 90 (FIG. 8) may be used for requests and responses. For responses, the number of requested keys may be zero.

Each public key used by PLNR module 62 may be linked to a certificate that is handled and discovered by DISCO module 68. By having certificates, DISCO module 68 prevents man in the middle attacks or attacks from nodes that should not be in the network. DISCO module 68 may enable linking public keys with their associated certificates. If a node has been flagged by TATL module 66 to have been compromised, the corresponding key and certificate may be blacklisted by DISCO. Blacklisting may be permanent, for the duration of an operation, for a predetermined time period, or until the compromise has been removed. Blacklisting prevents packets using the blacklisted key from going to PLNR verification. If a public key is not already in the whitelist (trusted list), a request packet may be built and sent to acquire the sender's certificate. Once the certificate is received it is verified against the central authority certificate. In the request packet, the current node's certificate may also be sent, thus reducing the amount of communication and allowing the receiver of the request to also verify a certificate.

IEAD module 64 may employ a high-performance intrusion prevention system. A non-exclusive, non-limiting example of such a network threat detection engine is Suricata. A single instance of Suricata can inspect multi-gigabit traffic and it is built around a multi-threaded, highly scalable open source code base. Suricata implements a complete signature language to match on known threats, policy violations and malicious behavior. Suricata will also detect many anomalies in the traffic it inspects. Suricata can use the specialized Emerging Threats Suricata ruleset and the VRT ruleset. Other intrusion prevention systems may be employed in addition to or instead of Suricata.

IEAD module 64 may forward packets 100 to the intrusion prevention system and receive verdicts back after it finishes its analysis. In an embodiment that employs Suricata, this may be accomplished with the netfilter queue library. Suricata is set up to read packets from the netfilter queue and then forward the verdicts onto another netfilter queue that IEAD module 64 may monitor. Once IEAD module 64 receives the verdict, it can decide to send the packets to the LAN or to TATL module 66. Although the AH has been stripped from the packet, it may be stored along with the packet information in case it needs to be reconstituted for a TATL notification.

Figure 10:
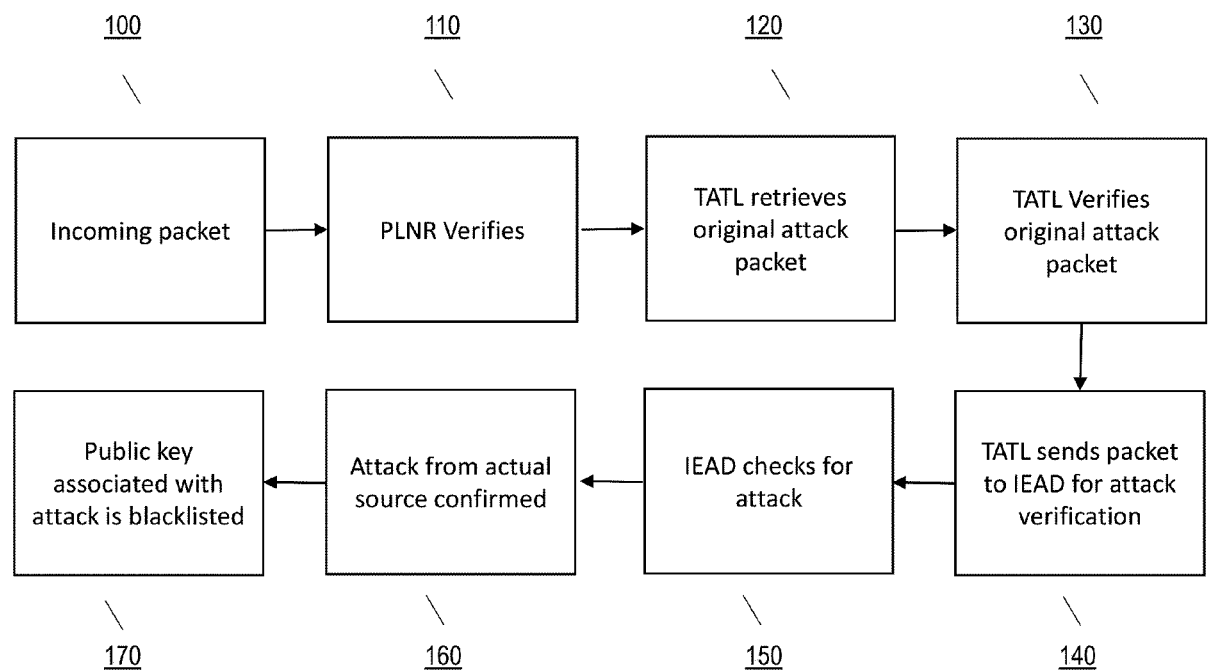
FIG. 10 provides a flow chart illustrating steps performed when a TATL control packet is received in accordance with one or more embodiments of the technology.

TATL module 66 is responsible for sending attack notifications flagged by IEAD module 64 and verifying attack notifications received. Once a packet is received, that has been flagged as an attack, it may be built into a TATL control message/packet (FIG. 9) and distributed to other nodes. To achieve agile isolation, nodes tell other nodes that they have been attacked, but in a way, that allows other nodes to independently verify the attack without any help from the sender of the notification. This prevents situations where a compromised node falsely reports attack notifications to force other nodes off the network. By sending real-time independently verifiable attack notifications, if a node is compromised, it will not be able to communicate with other nodes in the network, thus isolating the node from the network. After a packet is flagged from an attack, a new TATL control packet may be created for sending to other nodes in the network. This TATL packet may contain the original packet with the original AH so that other nodes can verify the original AH along with verifying the attack itself. As illustrated in FIG. 10, once a TATL control packet is received 100, the body of the packet may be verified via PLNR decryption 110 and the attack signature may be verified by the IEAD module 120-150. If the TATL control message is completely verified 160 it may be blacklisted by DISCO 170.

Subsequent to TATL module 66 verifying an attack notification received it may employ one or more methods of distribution. It can send the notification to a preconfigured list of IP addresses, send it to a broadcast IP address, send it to a list of trusted addresses retrieved from DISCO, and/or send it through peer to peer distribution. The peer to peer distribution method may maintain a list of addresses where the packet has been sent. If additional trusted nodes are available, they may be added to the list and the notification sent out to those addresses.

Utilizing the above technology, various attacks on the network may be thwarted. Attack Scenario #1, unknown node - no certificate/no trust. If security apparatus 50 is not able to discover or authenticate the certificate associated with a public key, it may drop the received packets. Therefore, any packet that is not trusted may not be further transmitted. Attack Scenario #2, modify packet en-route — fails AH verify. If a packet is modified prior to being received by security apparatus 50, signature verification will fail. Attack Scenario #3, Node compromised — attack detected, agile isolation. If an attacker takes control of a node and starts sending exploits, the attack will be detected by IEAD module 64, the certificate and public key will be blacklisted, and other nodes will be notified. Attack Scenario #4, fake attack notification — fails independent verification. The full original packet may be encapsulated inside the TATL control packet. All other nodes can independently verify that the original attack came from the original node, otherwise verification will fail and the attack notification will be ignored.

Having thus described at least one preferred embodiments of the technology, advantages can be appreciated. Variations from the described embodiments exist without departing from the scope of the claims. It is apparent that apparatus, systems and methods for removing or isolating a compromised node from a mobile network using packet level non-repudiation are provided. Although embodiments have been disclosed herein in detail, this has been done for purposes of illustration only, and is not intended to be limiting with respect to the scope of the claims, which follow. It is contemplated by the inventors that various substitutions, alterations, and modifications may be made without departing from the spirit and scope of the technology as defined by the claims. Other aspects, advantages, and modifications are considered within the scope of the following claims. The claims presented are representative of the technology disclosed herein. Other, unclaimed technology is also contemplated. The inventors reserve the right to pursue such technology in later claims.

Insofar as embodiments of the technology described above are implemented, at least in part, using a computer system, it will be appreciated that a computer program for implementing at least part of the described methods and/or the described systems is envisaged as an aspect of the technology. The computer system may be any suitable apparatus, system or device, electronic, optical, or a combination thereof. For example, the computer system may be a programmable data processing apparatus, a computer, a Digital Signal Processor, an optical computer or a microprocessor. The computer program may be embodied as source code and undergo compilation for implementation on a computer, or may be embodied as object code, for example.

It is also conceivable that some or all functionality ascribed to the computer program or computer system may be implemented in hardware, for example by one or more application specific integrated circuits and/or optical elements. Suitably, the computer program can be stored on a carrier medium in computer usable form, which is also envisaged as an aspect of the technology. For example, the carrier medium may be solid-state memory, optical or magneto-optical memory such as a readable and/or writable disk for example a compact disk (CD) or a digital versatile disk (DVD), or magnetic memory such as disk or tape, and the computer system can utilize the program to configure it for operation. The computer program may also be supplied from a remote source embodied in a carrier medium such as an electronic signal, including a radio frequency carrier wave or an optical carrier wave.

It is accordingly intended that all matter contained in the above description or shown in the accompanying drawings be interpreted as illustrative rather than in a limiting sense. It is also to be understood that the following claims are intended to cover all generic and specific features of the technology as described herein, and all statements of the scope of the technology which, as a matter of language, might be said to fall there between.

The invention claimed is:

1. A non-transitory computer-readable medium comprising one or more computer-executable instructions that, when executed by at least one processor of a computing device, cause the computing device to:
- receive an Internet Protocol (IP) packet that includes a header and an authentication header (AH),
- deconstruct the packet to obtain the AH, wherein the AH includes a public key associated with a sender of the packet, and associated with a certificate and the AH includes a signature associated with a sender of the packet;
- determine that a status of the certificate is enabled and perform additional processing on the packet;

wherein:
- the additional processing includes authenticating the signature located within the AH;
- the IP packet comprises an IP header and an IP payload; and
- the AH is disposed between the IP payload and a destination address within the IP header.

2. The non-transitory computer-readable medium according to claim 1, wherein the additional processing includes the instructions further causing the computing device to determine that the packet includes an attack signature; change the status of the certificate to disabled; and drop the packet and at least one subsequent packet received with an authentication header associated with the certificate.

3. The non-transitory computer-readable medium according to claim 1, wherein the additional processing includes the instructions further causing the computing device to inspect the packet for a threat, determine that the packet does not include a threat; and forward the packet to an intended address without the AH.

4. The non-transitory computer-readable medium according to claim 1, wherein the additional processing includes the instructions further causing the computing device to inspect the packet for a threat, determine that a threat exists, change the status of the certificate to disabled; and drop the packet and at least one subsequent packet received with an authentication header associated with the certificate.

5. The non-transitory computer-readable medium according to claim 4, wherein the additional processing includes the instructions further causing the computing device to generate a control packet which includes the packet, the AH and an identification of the threat.

6. The non-transitory computer-readable medium according to claim 1, the instructions further causing the computing device to receive a control packet, that includes another IP packet, another AH associated with another certificate and an identification of a threat; authenticate the control packet, the AH within the packet and the identification of the threat and determine that a status of the another certificate is enabled.

7. The non-transitory computer-readable medium according to claim 6, the instructions further causing the computing device to change the status of the another certificate to disabled; and drop at least one subsequent packet received with an AH associated with the another certificate.

8. The non-transitory computer-readable medium according to claim 1, wherein the determining that a status of the certificate is enabled includes comparing the certificate to a database of active certificates and inactive certificates.

9. A non-transitory computer-readable medium comprising one or more computer-executable instructions that, when executed by at least one processor of a computing device, cause the computing device to:
- receive an Internet Protocol (IP) packet that includes a header and an authentication header (AH), the AH includes a public key associated with the sender of the packet and associated with a certificate and a signature,
- deconstruct the IP packet to obtain another IP packet, which includes another AH, associated with another certificate and an identification of a threat;
- authenticate the certificate, subsequent to authenticating the certificate, authenticate the signature and the another AH within the IP packet and the identification of the threat and determine that a status of the another certificate is enabled.

10. The non-transitory computer-readable medium according to claim 9, the instructions further causing the computing device to change the status of the another certificate to disabled; and drop at least one subsequent packet received with an AH associated with the another certificate.

11. The non-transitory computer-readable medium according to claim 9, wherein the determining that a status of the another certificate is enabled includes comparing the another certificate to a database of active certificates and inactive certificates.

12. A system for isolating a compromised node within a mobile network, the system comprising:
- at least two nodes communicating through a wide area network (WAN);
- wherein one of the at least two nodes is the compromised node;
- wherein the other of the at least two nodes includes a non-transitory computer-readable medium comprising one or more computer-executable instructions that, when executed by at least one processor of a computing device, cause the computing device to:
- receive a packet over the WAN from the compromised node,
- determine that the packet includes a header and an authentication header (AH) and a threat;
- wherein at least a portion of the AH is associated with a certificate that is used to authenticate the received packet and a portion of the AH is associated with a signature that is used to further authenticate the received packet when the packet is authenticated using the certificate;
- wherein the threat is a threat received by the compromised node; and,
- in response to determining that the packet includes a threat, generate a control packet to isolate the compromised node from the network.

13. The non-transitory computer-readable medium according to claim 12, wherein the instructions further cause the computing device to change a status of the certificate to disabled; and drop the packet and at least one subsequent packet received with an AH associated with the certificate.

* * * * *